United States Patent
Egawa et al.

(10) Patent No.: US 7,348,517 B2
(45) Date of Patent: Mar. 25, 2008

(54) LASER CUTTING APPARATUS WITH A HIGH QUALITY LASER BEAM

(75) Inventors: Akira Egawa, Gotenba (JP); Minoru Ando, Yamanashi (JP); Atsushi Mori, Yamanashi (JP)

(73) Assignee: Fanuc Ltd, Yamanashi (JP)

( * ) Notice: Subject to any disclaimer, the term of this patent is extended or adjusted under 35 U.S.C. 154(b) by 27 days.

(21) Appl. No.: 11/197,259

(22) Filed: Aug. 5, 2005

(65) Prior Publication Data
US 2006/0044981 A1 Mar. 2, 2006

(30) Foreign Application Priority Data
Aug. 5, 2004 (JP) ............... 2004-229677

(51) Int. Cl.
*B23K 26/06* (2006.01)
*B23K 26/38* (2006.01)

(52) U.S. Cl. .................. 219/121.73; 219/121.67

(58) Field of Classification Search ........... 219/121.73, 219/121.74, 121.75, 121.67; 264/400
See application file for complete search history.

(56) References Cited

U.S. PATENT DOCUMENTS

| | | | | |
|---|---|---|---|---|
| 5,023,886 A | * | 6/1991 | Hobart et al. ............ | 372/99 |
| 5,237,150 A | * | 8/1993 | Karube ................ | 219/121.72 |
| 5,285,750 A | * | 2/1994 | Molian et al. .......... | 219/121.72 |
| 6,163,010 A | * | 12/2000 | Kobsa ................ | 219/121.67 |
| 7,102,806 B2 | * | 9/2006 | Boettcher ............. | 359/224 |
| 2005/0094288 A1 | * | 5/2005 | Hirai et al. ............. | 359/718 |
| 2006/0097430 A1 | * | 5/2006 | Xiaochun et al. ........ | 264/400 |

FOREIGN PATENT DOCUMENTS

| | | | |
|---|---|---|---|
| DE | 4217705 A1 | * | 12/1993 |
| JP | 62-93095 A | * | 4/1987 |
| JP | 6-218565 | | 8/1994 |
| JP | 2623355 B2 | * | 6/1997 |
| JP | 9-206973 A | * | 8/1997 |
| JP | 2000-343265 A | * | 12/2000 |
| JP | 2002-118312 | | 4/2002 |
| JP | 2002-120080 A | * | 4/2002 |
| JP | 2002-137079 A | * | 5/2002 |
| JP | 2002-283085 A | * | 10/2002 |
| JP | 2003-266192 A | * | 9/2003 |

* cited by examiner

*Primary Examiner*—Geoffrey S. Evans
(74) *Attorney, Agent, or Firm*—Staas & Halsey LLP (57) ABSTRACT

A laser cutting apparatus capable of properly cutting a workpiece having a large thickness with a laser beam. The laser cutting apparatus includes a gas laser oscillator; and an optical system including a collective lens and transmitting and collecting a laser beam generated in the gas laser oscillator to irradiate a workpiece with the laser beam. An index $M^2$ for evaluating a beam quality of the laser beam emerging from the optical system, with which the workpiece is irradiated, is in a range of 2.8 to 4.5; while the index $M^2$ is defined by a formula: $M^2=\pi\times(dm)^2/(4\times\lambda\times Zr)$; in which $\lambda$ is a wavelength of the laser beam; dm is a minimum beam diameter of the laser beam in a predetermined optical-path range including a focal point of the collective lens; and Zr is a distance between a first position on an optical axis, at which the minimum beam diameter dm is established, and a second position on the optical axis, at which a beam diameter "$2^{1/2}\times dm$" is established, in the laser beam in the predetermined optical-path range.

5 Claims, 9 Drawing Sheets

TEM 00
(GAUSSIAN MODE)
$M^2=1.0$

Fig.9B

TEM 01*
(RING MODE)
$M^2=1.7$

INVENTION
$M^2=2.8$

INVENTION
$M^2=4.1$

Fig.10

LASER CUTTING APPARATUS WITH A HIGH QUALITY LASER BEAM

BACKGROUND OF THE INVENTION

1. Field of the Invention

The present invention relates to a laser cutting apparatus.

2. Description of the Related Art

A cutting and machining process, for a metal or resinous material and using a laser beam, has been widely conducted. A laser apparatus for a cutting process generally includes a laser oscillator, as a source of a laser beam, an optical system (or a light guide system) for transmitting and collecting the laser beam onto a material to be processed (i.e., a workpiece), a mechanical driving system for scanning the spots to be irradiated with the beam on the workpiece, a control system for controlling the laser oscillator or the mechanical driving system, and auxiliary apparatuses such as a coolant supply apparatus, an assist gas feeding apparatus, etc.

In general, a laser cutting apparatus of this type is considered to have a higher machining capability when the collecting properties (i.e., a beam quality) of a laser beam are superior. In fact, in the case where a thin metallic material such as a metal sheet is cut, as a conventional main application, with a laser cutting apparatus using a $CO_2$ laser, it is known that the higher the collecting properties of the laser beam, the faster the metal sheet can be cut and the better the surface quality provided by the cutting process.

A laser beam typically emerges from a laser oscillator as a generally parallel beam, and thus has good collecting properties. There may be a case, however, wherein the laser beam cannot be focused, depending upon the energy distribution thereof, into a spot at the diffraction limit. In other words, depending upon the quality of the laser beam, the spot size may vary even when the diffusion angle and the diameter of the beam incident on a collective or condenser lens are not changed. This is due to the collecting properties of the laser beam, and the higher the collecting properties, the smaller the possible spot size.

An $M^2$ value is often used as an index for evaluating the collecting properties of a laser beam. The index $M^2$ is typically defined by a formula:

$$M^2 = \pi \times (dm)^2 / (4 \times \lambda \times Zr)$$

wherein "$\lambda$" is a wavelength of the laser beam; "dm" is a minimum beam diameter of the laser beam in a predetermined optical-path range including a focal point of a collective lens; and "Zr" is a distance (or a Rayleigh range) between a first position on an optical axis, at which the minimum beam diameter "dm" is established, and a second position on the optical axis, at which a beam diameter "$\sqrt{2} \times dm$" is established, in the laser beam in the predetermined optical-path range.

Figure 10:
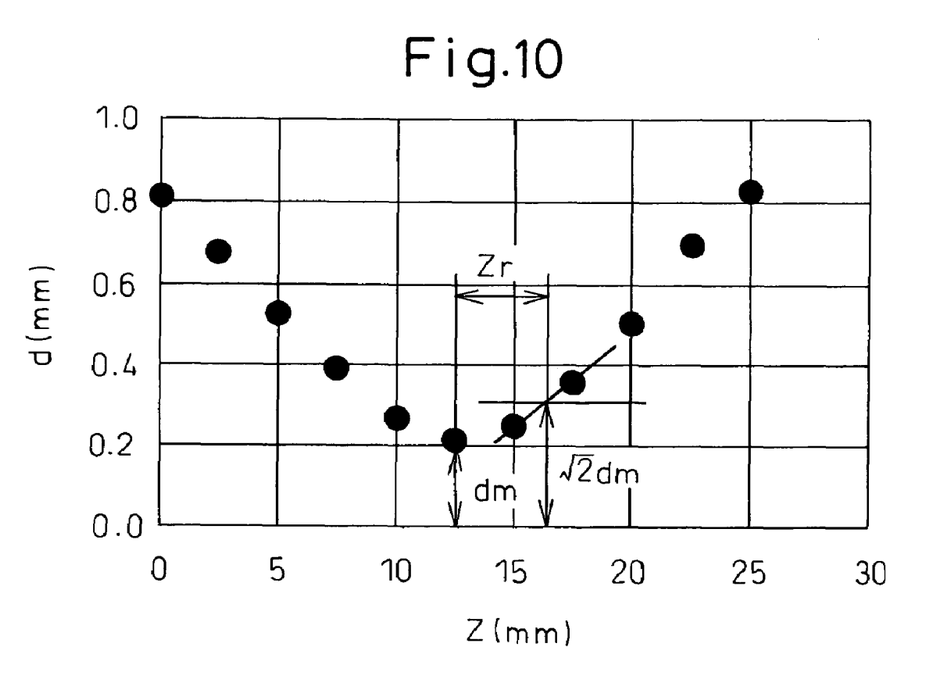
FIG. 10 is a view showing an example of a transition, of a diameter of a laser beam, in the vicinity of a focal point of a collective lens.

FIG. 10 is a view showing an example of the transition of the beam diameter of a laser beam collected by a collective or condenser lens, in the vicinity of a focal point. The horizontal axis represents a position Z (mm) in the direction of the optical axis of the collective lens with the position of the center of the collective lens taken as Z=0, and the vertical axis represents the beam diameter d (mm) of the laser beam at position Z. A point • represents an actually measured value and, by interpolation between several points, it is found that, in the illustrated example, the distance Zr between "the first position defining the minimum beam diameter dm (=about 0.22 mm)" and "the second position defining the beam diameter of $\sqrt{2} \times dm$ (=about 0.31 mm)" is about 4 mm.

As can be seen from the above formula of definition, a smaller $M^2$ value indicates smaller spot size and higher collecting properties. The theoretical minimum value of $M^2$ is 1 and, at this value, a laser beam theoretically has the best collecting properties.

Conventionally, a cutting process using a laser beam is mainly applied to the cutting of a thin metal sheet with a thickness of generally 10 mm or less, and the required $M^2$ value for this application is less than 2.8. Typically, a laser beam having $M^2$ value in the vicinity of 2 is employed. In recent years, however, with increasing power output of laser oscillators, it is highly required to cut thick plates of 20 to 30 mm or more in thickness. There is a problem, when such a thick plate is to be cut using a laser, of the difficulty in adequately supplying an assist gas to a cutting groove.

In a cutting operation using a laser beam, in general, the laser beam emerging from a processing nozzle of a processing apparatus is collected so that the surface of a workpiece is irradiated with the laser beam, so as to melt a minute region of the workpiece at an extremely high temperature, and an assist gas is injected from the same processing nozzle, coaxially with the laser beam and at a predetermined pressure and flow rate, so as to locally remove the molten material of the workpiece by physical and chemical interaction with the assist gas.

For example, when a steel plate is to be cut, oxygen in particular is used as the assist gas, and the heat generated in a combustion reaction with the oxygen is also utilized in melting the steel material. As the thickness of the plate increases, the oxygen assist gas supplied to the surface of the steel plate is exhausted midway in the thickness direction so that, near the back surface of the steel plate, the cutting becomes difficult due to a deficiency of oxygen. If, at this time, the pressure of the supplied oxygen gas is increased to increase the amount of supply, the flow rate of the assist gas is excessively increased so that an anomalous combustion (or a self-burning phenomenon) takes place at the front surface of the steel plate. As a result, surface quality of the cut section may be deteriorated, or dross may be accumulated to degrade the function of the products.

Also, in the case where nitrogen or argon gas, that does not generate heat from a combustion reaction, is used as the assist gas, if the thickness of the workpiece is increased, the flow rate tends to be reduced midway in the thickness direction of the workpiece, and the power for blowing away the molten metal, etc. tends to become inadequate. In the case of non-metallic material, the function of the assist gas, as a cooling gas to suppress carbonization or excessive melting, tends to be impaired by the decrease in the flow rate.

In order to deal with these problems, countermeasures, such as proper selection of nozzle diameter, distance from the nozzle to the surface of the workpiece, the shape of the nozzle, etc., or proper distribution of flow rate in the radial direction of the nozzle (by adopting a so-called double nozzle), have been taken. Other measures are also known, in which, when a thick plate is to be cut, a collective lens having a focal length longer than that of a collective lens typically used for cutting a thin plate may be used to perform the cutting process by a portion of the collected laser beam having a larger spot size, so that the cutting width of the workpiece is increased to increase the amount of supplied assist gas in the direction of plate thickness. Similarly, it is also known that the focal position of the collective lens can be adjusted to adjust the spot size or control the cutting width.

However, an optimum design is generally difficult with the technique of controlling the flow of the assist gas by suitably designing the nozzle shape, etc. With the technique of adjusting the focal length or focal position of the collective lens, there is a limit to the thickness of the workpiece to obtain an expected result.

On the other hand, as is described in Japanese Unexamined Patent Publication No. 6-218565 (JP-A-6-218565) and Japanese Unexamined Patent Publication No. 2002-118312 (JP-A-2002-118312), it is known that the collecting properties of a laser beam can be controlled so as to be able to cut both thin plates and thick plates. In the methods disclosed in these Patent Documents, the cutting of a thin plate is conducted with the laser oscillation in TEM00 mode (the so-called Gaussian mode: $M^2=1.0$), and the cutting of a thick plate is conducted with the laser oscillation in TEM01* mode (the so-called ring mode: $M^2$=about 1.7: * denotes a calculation in polar coordinates). In TEM01* mode, as compared to TEM00 mode, the thermal load at the center of the collective lens is small, so that a temperature rise at the center of the collective lens due to absorption of laser beam, and hence the degradation of a beam collecting properties and the variation of the focal position due to associated deformation of the lens shape and of the distribution of refractive index, can be effectively suppressed.

When above-described method is applied, for example, to the cutting of the steel plates with oxygen as assist gas, however, the expected result can only be obtained for thicknesses in the range of 12 mm to 16 mm, and the advantage of the ring mode over Gaussian mode can hardly be recognized at thickness greater than 20 mm.

SUMMARY OF THE INVENTION

It is an object of the present invention to solve the above-described problems associated with prior art, and to provide a laser cutting apparatus capable of properly cutting a workpiece having a large thickness with a laser beam, without changing the constitution of a processing nozzle and/or a collective lens.

In order to accomplish the above object, the present invention provides a laser cutting apparatus comprising a gas laser oscillator; and an optical system including a collective lens and transmitting and collecting a laser beam generated in the gas laser oscillator to irradiate a workpiece with the laser beam; wherein an index $M^2$ for evaluating a beam quality of the laser beam emerging from the optical system, with which the workpiece is irradiated, is in a range of 2.8 to 4.5; while the index $M^2$ is defined by a formula: $M^2=\pi \times (dm)^2/(4 \times \lambda \times Zr)$; in which $\lambda$ is a wavelength of the laser beam; dm is a minimum beam diameter of the laser beam in a predetermined optical-path range including a focal point of the collective lens; and Zr is a distance between a first position on an optical axis, at which the minimum beam diameter dm is established, and a second position on the optical axis, at which a beam diameter "$2^{1/2} \times dm$" is established, in the laser beam in the predetermined optical-path range.

In the above-described laser cutting apparatus, the minimum beam diameter dm and the distance Zr may have a correlation of "dm/Zr>0.003".

The optical system may not include a beam-quality modifying optical element affecting a value of the index $M^2$.

Alternatively, the optical system may include a beam-quality modifying optical element affecting a value of the index $M^2$.

BRIEF DESCRIPTION OF THE DRAWINGS

The above and other objects, features and advantages of the present invention will become more apparent from the following description of preferred embodiments in connection with the accompanying drawings, wherein.

DETAILED DESCRIPTION

The embodiments of the present invention are described below in detail, with reference to the accompanying drawings. In the drawings, the same or similar components are denoted by common reference numerals.

Figure 1:
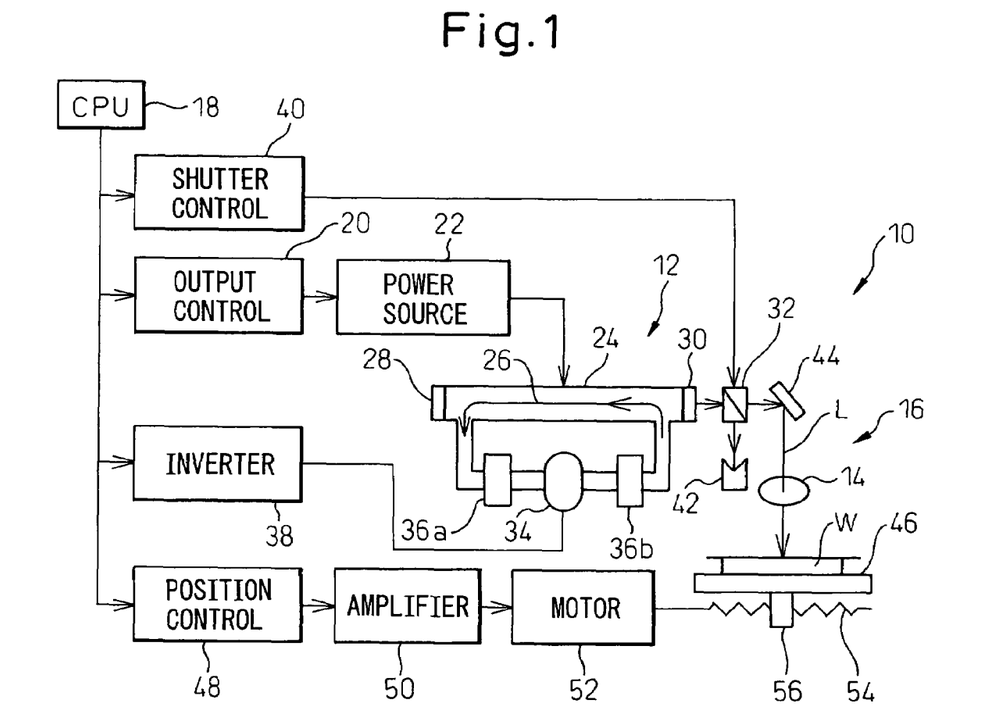
FIG. 1 is a view showing, partially in a block diagram, the general configuration of a laser processing system including a laser cutting apparatus according to an embodiment of the present invention.
Figure 2:
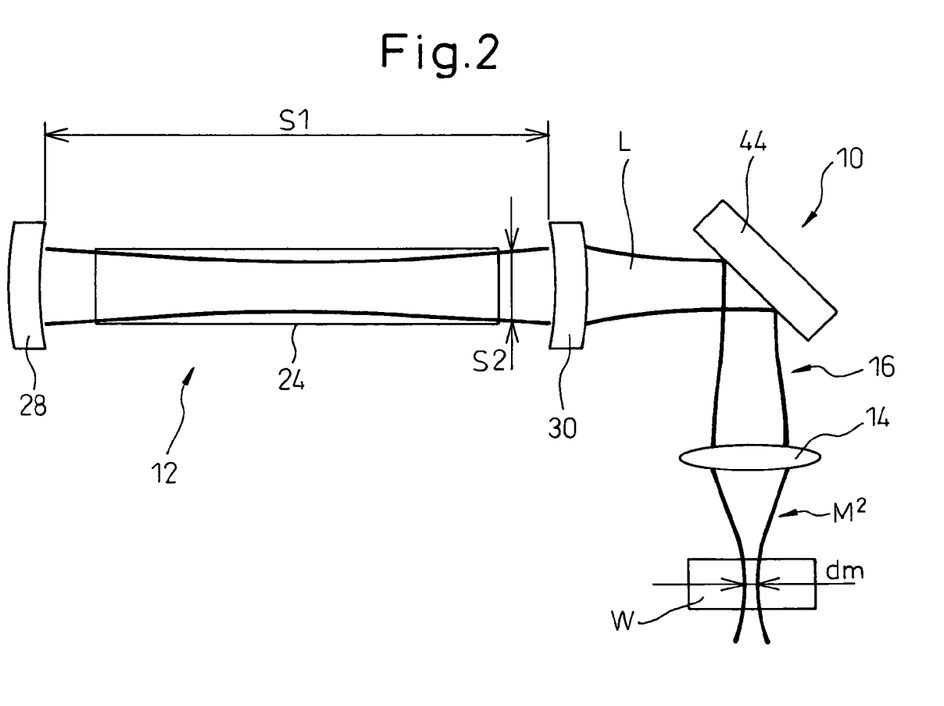
FIG. 2 is a schematic view showing the basic configuration of the laser cutting apparatus of FIG. 1.

Referring to the drawings, FIG. 1 shows the general configuration of a laser processing system including a laser cutting apparatus 10 according to an embodiment of the present invention, and FIG. 2 schematically shows the basic configuration of the laser cutting apparatus 10 of FIG. 1.

As shown in FIG. 2, the laser cutting apparatus 10 according to the present invention includes a gas laser oscillator 12, and an optical system 16 including a collective lens 14 and transmitting and collecting a laser beam L generated in the gas laser oscillator 12 to irradiate a workpiece W with the laser beam L. The laser cutting apparatus 10 is constructed such that an index $M^2$ for evaluating collecting properties (hereinafter referred to as a beam quality) of the laser beam L emerging from the optical system, with which the workpiece is irradiated, is in a range of 2.8 to 4.5; while the index $M^2$ is defined by a formula: $M^2=\pi \times (dm)^2/(4 \times \lambda \times Zr)$; in which $\lambda$ is a wavelength of the laser beam; dm is a minimum beam diameter of the laser beam in a predetermined optical-path range including a focal point of the collective lens; and Zr is a distance between a first position on an optical axis, at which the minimum beam diameter dm is established, and a second position on the optical axis, at which a beam diameter "√2×dm" is established, in the laser beam in the predetermined optical-path range.

The beam quality of the laser beam affects the width of the cutting groove, and the width of the cutting groove in turn affects the flow of an assist gas. Thus, if the beam quality of the laser beam is excessively high, the width of the cutting groove becomes small and the assist gas flow is thereby impeded, which leads to the lowering of cutting capability. On the other hand, if the beam quality of the laser beam is excessively low, an energy density required for a cutting cannot be achieved, which also deteriorates the cutting capability.

The inventors of the present application have found, after an intensive study was conducted on a cutting phenomenon by the laser beam, that a requirement for a good processing capability can be defined by the above-described specific range of $2.8 \leq M^2 \leq 4.5$ of the beam quality evaluating index. This requirement realizes an improvement of a processing performance by 20% or more over the conventional apparatus, with regard to the processing capability in terms of a cutting speed, a cut surface quality, a cut plate thickness, etc. Experimental results demonstrating the relation between the beam quality evaluating index and the processing capability will be described later.

Thus, in accordance with the laser cutting apparatus 10 having the above configuration, good processing characteristics can be obtained when the workpiece W with a thickness of at least 20 mm is cut, and the improvement of a cut surface quality can be expected when the workpiece W with a thickness of less than 20 mm is cut. Also, the range of the beam quality evaluating index of the laser beam L is explicitly defined, so that design details can be easily determined in the development of laser cutting apparatuses, so that the development cost can be significantly reduced, and the processing capability of a laser cutting apparatus can be predicted.

FIG. 1 shows the general configuration of a laser processing system including the laser cutting apparatus 10 as described above. As shown in FIGS. 1 and 2, a processor (CPU) 18 reads out a processing program stored in a not-shown memory, and controls the overall operation of the laser processing system. An output control circuit 20 includes an A/D converter incorporated therein, and converts an output command signal received from the processor 18 into a current command signal to output the latter. An excitation power source 22 generates, after rectifying a commercial power source, a high frequency current by carrying out a switching operation, and supplies the high frequency current corresponding to the current command value to a discharge tube 24 of the gas laser oscillator 12.

Laser medium gas 26 is circulated inside the discharge tube 24 through a circulating path of the gas laser oscillator 12 and, at an instant when a high frequency voltage is applied from the excitation power source 22, the discharge tube 24 generates an electric discharge to excite the laser medium gas 26. A rear mirror 28 composed of a germanium mirror with reflectance of 99.5% and an output mirror 30 composed of a zinc-selenium mirror with reflectance of 65% constitute a stable resonator in the discharge tube, which amplifies the light of induced emission at wavelength of 10.6 μm from the excited laser medium gas molecules, and outputs a part of the amplified light as a laser beam L through the output mirror 30. A shutter 32 controllable to be opened and closed is disposed in the optical path of the output laser beam L (shown only in FIG. 1).

In the circulating path of the gas laser oscillator 12, a blower unit (e.g., a turbo-blower) 34 is provided to circulate the laser medium gas 26 through cooling units 36a and 36b. The processor 18 controls the operation of the blower unit 34 through a high frequency inverter 38. The cooling unit 36a disposed upstream of the blower 34 is used for cooling the laser medium gas 26 excited at high temperature by a laser oscillation, and the cooling unit 36b disposed downstream of the blower 34 is used for removing a compression heat produced by the blower 34. A shutter control circuit 40 controls the shutter 32, to be opened or closed, based upon the command from the processor 18.

The shutter 32 is composed of a copper or aluminum plate provided on the surface thereof with gold plating. When the shutter 32 is closed, the shutter 32 reflects the laser beam L output from the output mirror 30 and causes the reflected beam to be absorbed by a beam absorber 42. When the shutter 32 is opened, the laser beam L is turned or bent by a bender mirror 44, and is directed to the collective lens (or a lens system, in some cases) 14. The laser beam L is collected by the collective lens 14, so that the surface of the workpiece W is irradiated with the laser beam L.

The laser-beam irradiation position on the workpiece W (which is the position in a plane perpendicular to the optical axis) is determined by a shifting position (i.e., an X-Y axes position) of a table 46 carrying the workpiece W. A position control circuit 48 controls the rotational operation of a servo-motor 52 through a servo-amplifier 50, and also controls the shifting operation of the table 46 through a ball screw 54 and a nut 56. The position of the workpiece W is thereby controlled.

The position of the workpiece W or a laser-beam emitting member (e.g., a not-shown nozzle) in the direction of the optical axis (or a Z-axis direction) is suitably adjusted such that, as shown in FIG. 2, the position of the minimum beam diameter "dm" of the collected laser beam (i.e., the focal position of the collective lens 14) is set within the workpiece W. In this connection, if the driving mechanism of the table 46 includes a Z-axis driving mechanism, the adjustment of the focal position may be performed on the side of the table 46.

As can be seen from the formula of the beam quality evaluating index $M^2$ as described, the beam quality of the laser beam L applied onto the workpiece W is improved (in other words, the beam quality evaluating index $M^2$ is decreased), when the minimum beam diameter "dm" in the vicinity of the focal point is reduced and also when the change in the beam diameter along the optical axis is reduced (i.e., "Zr" is increased). On the other hand, the beam quality evaluating index $M^2$ also changes due to the dimensions of the components of the gas laser oscillator 12, such as the curvatures of the rear mirror and of the output mirror, the length S1 of the resonator, the inner diameter S2 of the discharge tube, etc. Therefore, in order to set the beam quality evaluating index $M^2$ in the range of 2.8 to 4.5, it is possible to adopt one or both of measures for suitably modifying the configuration of the gas laser oscillator 12 and for suitably modifying the configuration of the optical system 16.

Figure 3:
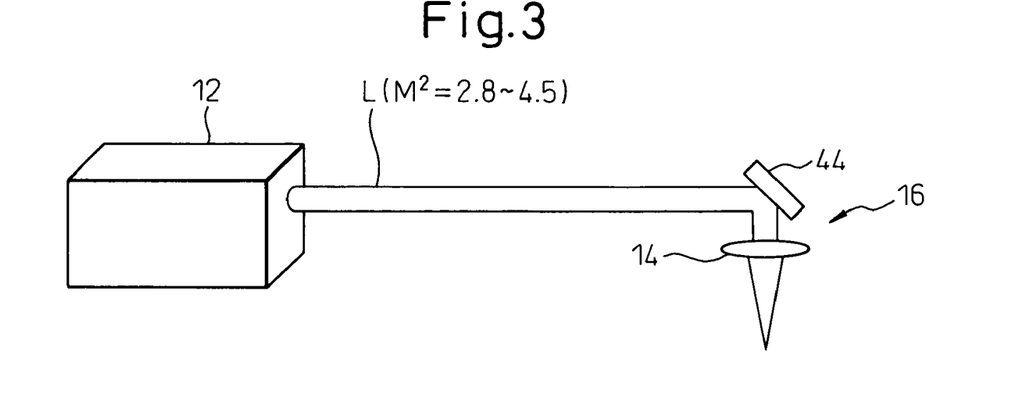
FIG. 3 is a view for explaining a configuration provided with no beam-quality modifying optical element.

FIG. 3 shows a configuration in which the workpiece is irradiated with the laser beam L having the beam quality evaluating index $M^2$ in the range of 2.8 to 4.5, by suitably modifying the configuration of the gas laser oscillator 12. In this configuration, the dimensions of components of the gas laser oscillator 12 are adjusted, so as to output a laser beam L with $M^2$ in the range $2.8 \leq M^2 \leq 4.5$ from the gas laser oscillator 12. The laser beam L is emitted to the workpiece (not shown in FIG. 3) through an optical system 16 composed of a bending mirror 44 provided with a plane reflector and a collective lens 14 composed of a spherical mirror with a negligible aberration, without modifying the beam quality evaluating index $M^2$. In order to avoid the alteration of the beam quality evaluating index $M^2$ of the laser beam L output from the gas laser oscillator 12, it is effective to eliminate an optical element (referred to as a beam-quality modifying optical element, in this application), that may modify the beam quality evaluating index $M^2$, in the optical system 16 between the gas laser oscillator 12 and a processed point. With this configuration, the cutting of a metallic or non-metallic workpiece with, e.g., thickness exceeding 25 mm, can be carried out with no problem.

Figure 4:
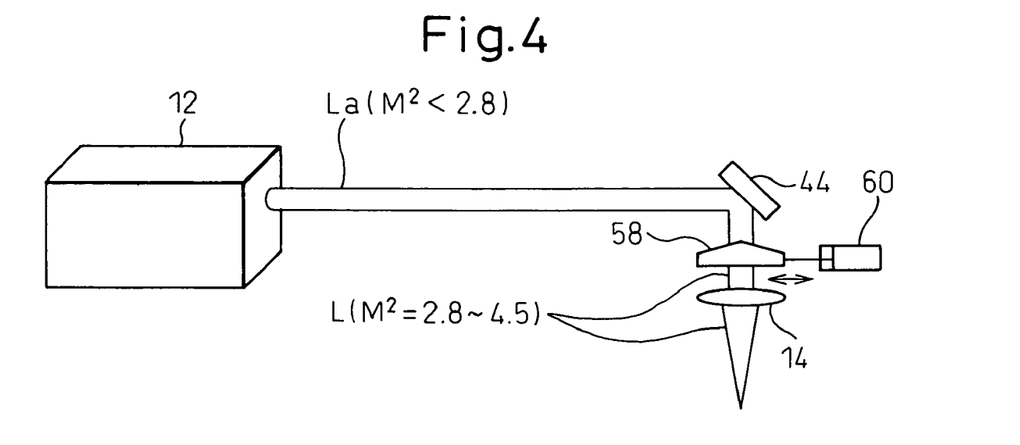
FIG. 4 is a view for explaining a configuration provided with a beam-quality modifying optical element.

FIG. 4 shows a configuration in which the workpiece is irradiated with the laser beam L having the beam quality evaluating index $M^2$ in the range of 2.8 to 4.5, by suitably modifying the configuration of the optical system 16. In this configuration, the gas laser oscillator 12 outputs a laser beam "La" having the beam quality evaluating index $M^2$ less than 2.8. Then, a beam-quality modifying optical element 58 is inserted and arranged in the optical system 16 including the bender mirror 42 having a plane reflecting surface and the collective lens 14 composed of a spherical lens with a negligible aberration, whereby the beam quality evaluating index $M^2$ of the laser beam "La" output from the gas laser oscillator 12 is modified so that the workpiece (not shown in FIG. 4) is irradiated with a laser beam L having $2.8 \leq M^2 \leq 4.5$. The beam-quality modifying optical element 58 may be, for example, an aspheric lens, and is provided to be capable of being inserted and extracted relative to an optical path of the laser beam L by using an actuator 60. As the actuator 60, an electromagnetic actuator that operates in accordance with the command from CPU 18 (FIG. 1), for example, may be adopted. While an aspheric lens is a typical transmission type beam-quality modifying optical element, the combination of spherical lenses having short focal lengths may be alternatively used to increase $M^2$ value under the influence of a spherical aberration.

In accordance with the above configuration in which a beam-quality modifying optical element 58 is provided to be insertable and extractable relative to the optical path of the laser beam, when the gas laser oscillator 12 having, e.g., output power of 4 kW and capable of outputting a laser beam "La" with $M^2=1.3$, it is possible to carry out the cutting process for an aluminum alloy plate of 1 mm in thickness at a cutting speed of 80 m/min with the beam-quality modifying optical element 58 being removed from the optical path of the laser beam, whereas it is possible to stably cut a mild steel plate, 30 mm in thickness, with the beam-quality modifying optical element 58 being inserted into the optical path of the laser beam. Therefore, a laser cutting apparatus 10 that has excellent performance in a thin plate cutting and a thick plate cutting can be realized simply and conveniently, without providing a special type of gas laser oscillator 12.

Figure 5A:
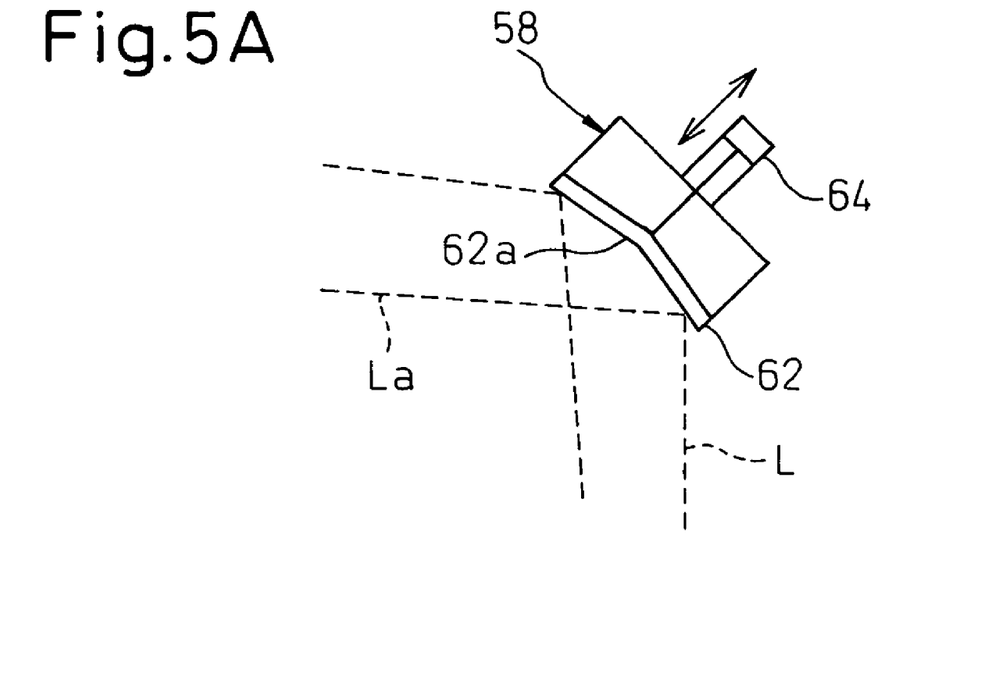
FIGS. 5A and 5B are views for explaining a configuration using a variable-shape type aspheric mirror as a beam-quality modifying optical element.
Figure 5B:
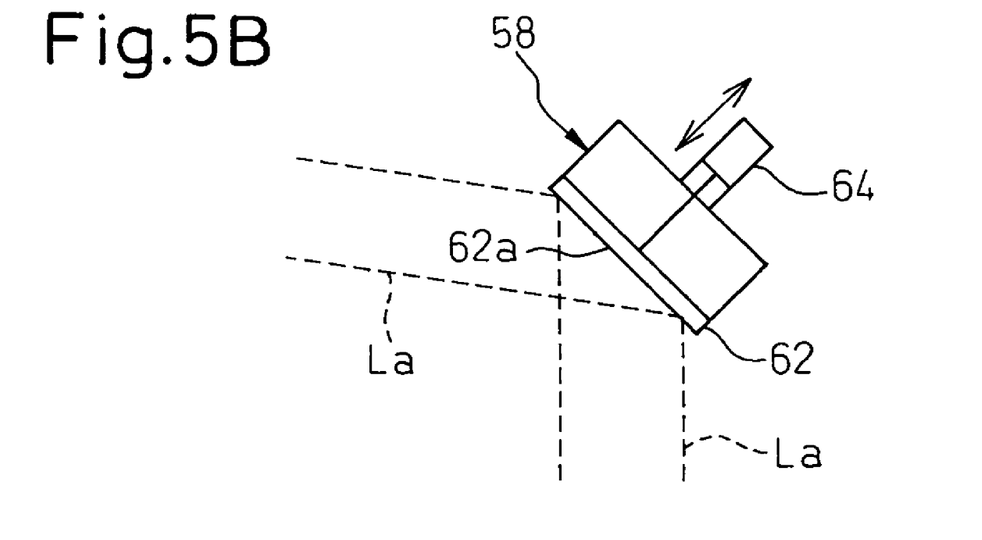

As the beam-quality modifying optical element 58 for modifying the $M^2$ value, besides the transmission type element such as the above-described aspheric lens, a reflection type element such as an aspheric mirror may also be adopted. In particular, when a variable-shape type aspheric mirror, in which the curvature of a reflecting surface can be changed, is used, the $M^2$ modifying capability of the beam-quality modifying optical element 58 can be advantageously adjusted by varying the curvature of the reflecting surface. FIGS. 5A and 5B show a configuration in which a variable-shape type aspheric mirror is used as the beam-quality modifying optical element 58. In this configuration, in place of the bender mirror 44 shown in FIG. 3, a beam-quality modifying optical element 58 composed of the variable-shape type aspheric mirror is placed.

The beam-quality modifying optical element 58 composed of the variable-shape type aspheric mirror includes a membrane 62 having a reflective surface 62a, and is constructed such that the shape of the reflective surface 62a can be changed between a plane surface and an aspheric surface (a conical surface, in the Figure) when an actuator 64 operates to deform the membrane 62. FIG. 5A shows a state in which the reflective surface 62a assumes the aspheric surface, and FIG. 5B shows a state in which the reflective surface 62a assumes the plane surface. In this connection, when three or more operating positions are set for the actuator 64, one or more intermediate shapes between the shapes shown in FIGS. 5A and 5B can be set for the reflective surface 62a. Further, in order to avoid the overheating of the reflective surface 62a, a cooling fluid, generally at atmospheric pressure, may be filled into a back space of the membrane 62 opposite to the reflective surface 62a.

As shown in FIG. 5B, when the reflective surface 62a is a plane surface, the laser beam "La" incident upon the beam-quality modifying optical element 58 is reflected without changing the value of $M^2$. Thus, unless other beam-quality modifying optical element is present, a thin-plate workpiece can be cut at a very high speed by adopting the gas laser oscillator 12 outputting a laser beam "La" with a small $M^2$ (e.g., less than 2.8). On the other hand, when a thick-plate workpiece is to be cut, the actuator 64 is operated to deform the reflective surface 62a into, e.g., the shape shown in FIG. 5A, so that it is possible to modify the $M^2$ of the reflected laser beam L into the range of 2.8 to 4.5, from the incident laser beam "La" having the small $M^2$ (e.g., less than 2.8).

In the laser cutting apparatus 10 as described above, the ratio "dm/Zr" between the distance "Zr" corresponding to a focal depth and the beam diameter "dm" at the focal point will be considered below. This ratio represents the magnitude of the beam diameter relative to the focal depth and, from the other point of view, is an index representing the collecting angle of the laser beam L collected by the collective lens 14. The collecting angle of the laser beam L is a factor determining the quality of a cutting process. In particular, in a cutting process of a non-ferrous metal by using a nitrogen assist gas, the cutting proceeds with multiple reflection of the laser beam within a cut groove, so that the quality of cutting can be remarkably improved under a suitable collecting angle.

Provided that a generally parallel incident laser beam with a beam diameter "D" is collected by the collective lens 14 with a focal length "f" under a convergence angle θ (a total angle) toward the focal point, the following equation is given:

$$M^2 = \pi \times (dm)^2 / (4 \times \lambda \times Zr) = \pi \times dm \times \theta / 4\lambda$$

and therefore, $$\theta = dm/Zr$$

On the other hand, $$\tan(\theta/2) = D/(2f)$$

and therefore, $$\theta = dm/Zr = 2\tan^{-1}(D/(2f))$$

If f=20 inches (508 mm), D=15 mm, then, $$dm/Zr=0.00295$$

If f=2.5 inches (63.5 mm), D=20 mm, then, $$dm/Zr=0.312$$

It was found from the experimental result that, when the incident laser-beam diameter D and the focal length f of the collective lens 14 are selected such that dm/Zr>0.003, the laser beam L can be collected by the collective lens 14 in a suitable angle, so that the cutting process of a non-ferrous metal workpiece using a nitrogen assist gas, wherein the cutting proceeds by multiple reflection of the laser beam within the cutting groove, can be carried out quite smoothly. Therefore, it is preferred that the values of f and D are combined in such a manner that the value calculated from the formula $dm/Zr=2\tan^{-1}(D/(2f))$ is 0.003 or greater.

Next, the critical significance of the feature of "$2.8 \leq M^2 \leq 4.5$", which is a basic constituent feature of the present invention, will be explained with reference to FIGS. 6 to 9B respectively showing results of various experiments.

Figure 6:
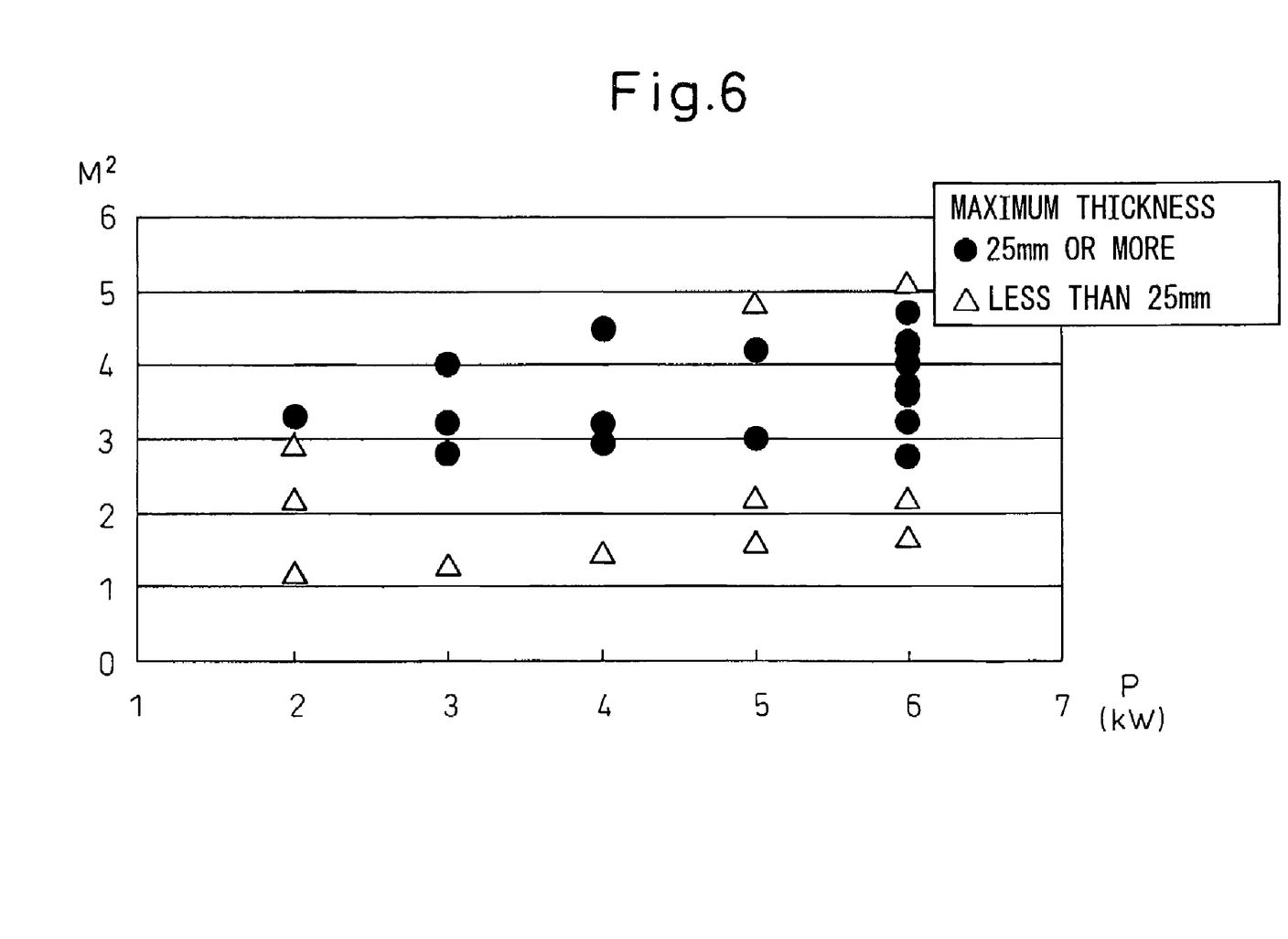
FIG. 6 is a view showing a correlation between an output power of a laser beam and a beam quality evaluating index.

FIG. 6 shows a correlation between the output power P of the laser beam and the beam quality evaluating index $M^2$. In FIG. 6, the horizontal axis represents a laser output power P (kW), and the vertical axis represents the evaluating index $M^2$. Each point • represents a condition (or a correlation of P and $M^2$) in which the maximum thickness of a workpiece that can be cut is 25 mm or greater. Each point Δ represents a condition (or a correlation of P and $M^2$) in which the maximum thickness of a workpiece that can be cut is less than 25 mm. As can be seen from the drawing, over the wide range of the laser output power P, if $M^2$ is in the range of 2.8 to 4.5, it is possible to stably cut the workpiece of 25 mm or greater in thickness.

Figure 7:
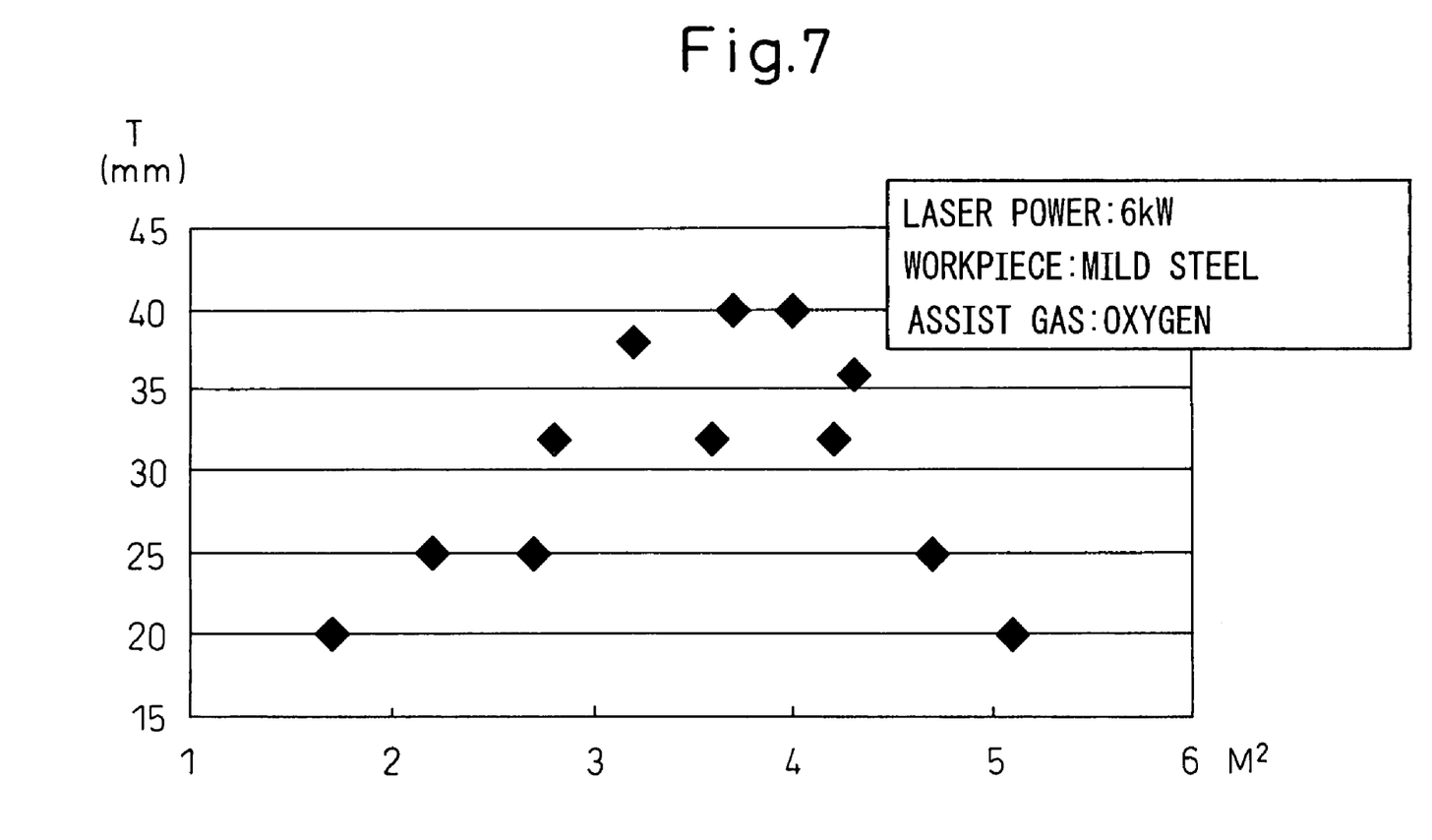
FIG. 7 is a view showing a correlation between a beam quality evaluating index and a maximum cut thickness at an output power of 6 kW.

FIG. 7 shows a correlation between the beam quality evaluating index $M^2$ and the maximum thickness T of a workpiece that can be cut, with a laser output power being fixed at 6 kW. In FIG. 7, the horizontal axis represents the evaluating index $M^2$, and the vertical axis represents the maximum cutting thickness T. In this experiment, the cut workpiece is a mild steel material SS400, and the assist gas is oxygen. Conditions such as the focal length of the collective lens, the pressure of the assist gas, the focal position, the cutting speed, etc., which gives an optimum result, are determined suitably depending upon the situation. As shown in the drawing, if $M^2$ is in the range of 2.8 to 4.5, a workpiece of 25 mm or greater in thickness can be advantageously cut.

Figure 8:
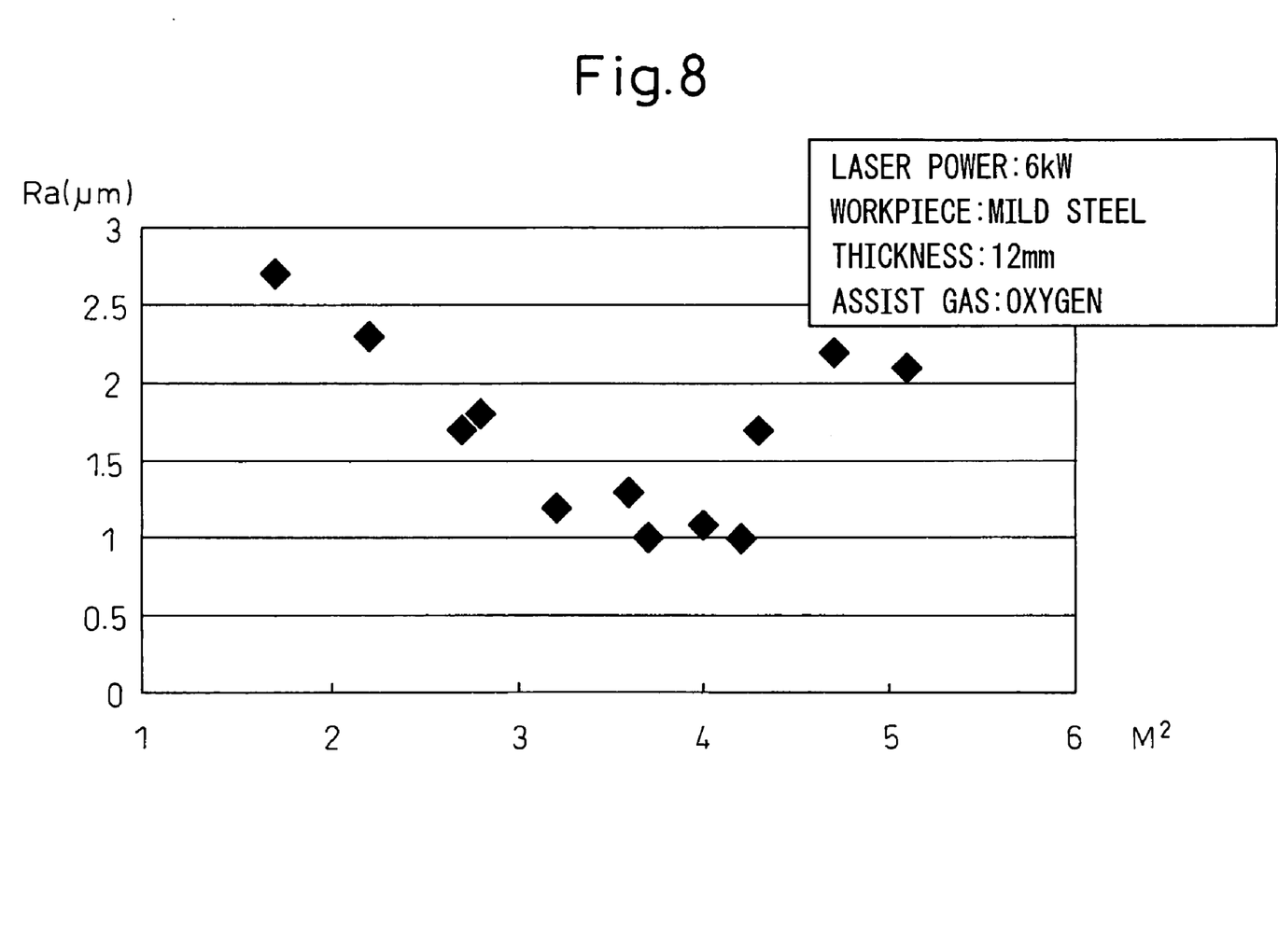
FIG. 8 is a view showing a measurement result of a cut-surface roughness when a mild steel plate 12 mm in thickness is cut at an output power of 6 kW.

FIG. 8 shows a measurement result on a cut surface roughness, in a condition where a mild steel of 12 mm in thickness is cut with the laser output power being fixed at 6 kW. In FIG. 8, the horizontal axis represents the evaluating index $M^2$, and the vertical axis represents the cut surface roughness by an arithmetic mean roughness Ra (μm). In this experiment, the cut workpiece is a mild steel material SS400, the assist gas is oxygen, and a cutting speed is 2.4 m/min. As shown in the drawing, the cut surface roughness is reduced, in a range where the $M^2$ is 2.8 to 4.5. Therefore, when the present invention is applied to a relatively thin workpiece, a smooth and good cut surface is obtained.

Figure 9A:
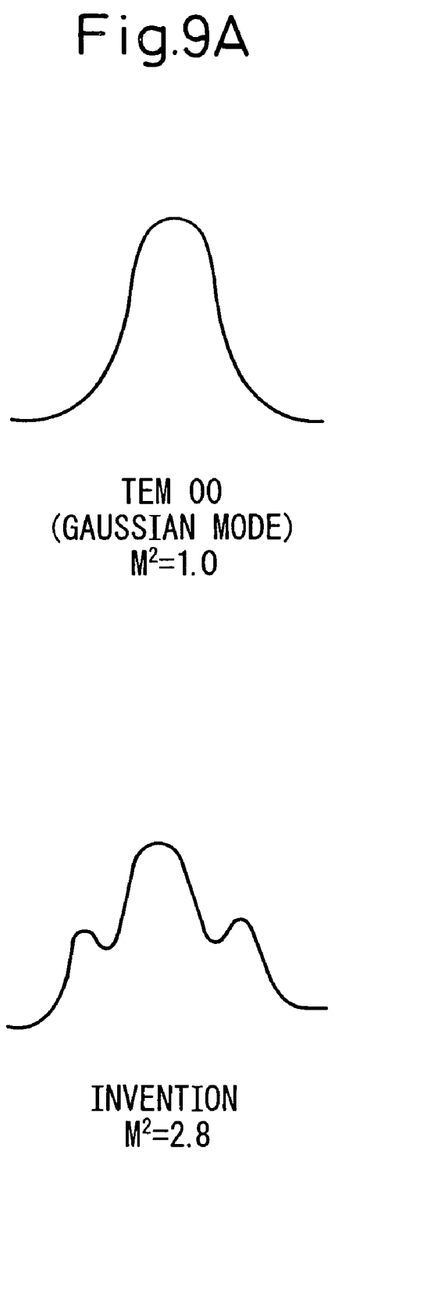
FIG. 9A is a view showing one example of an energy distribution of a laser beam, according to the present invention, as compared to an energy distribution in a Gaussian mode.
Figure 9B:
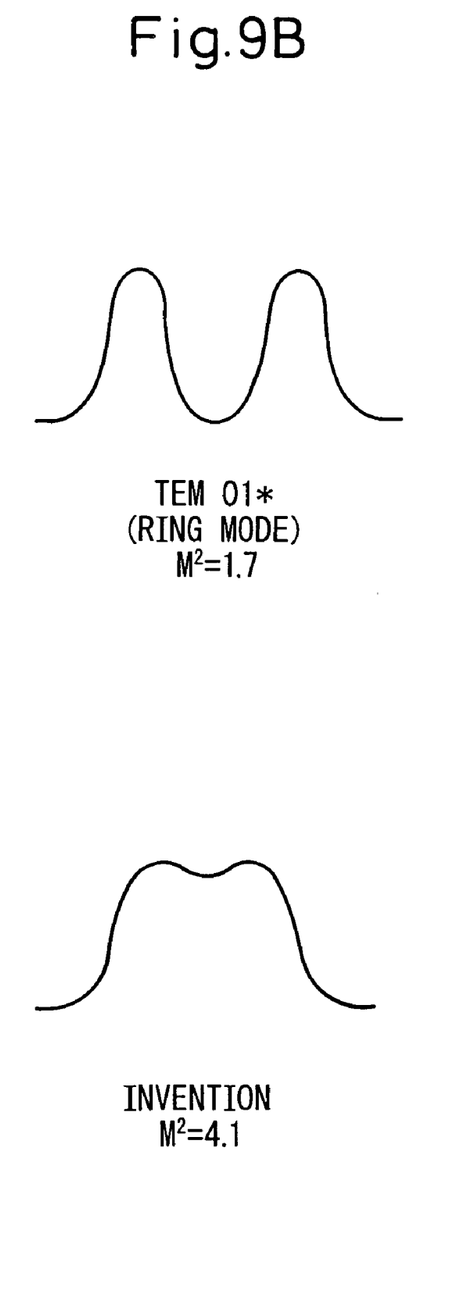
FIG. 9B is a view showing another example of an energy distribution of a laser beam, according to the present invention, as compared to an energy distribution in a ring mode.

FIGS. 9A and 9B illustrate that the characteristic feature of the present invention, i.e., "$2.8 \leq M^2 \leq 4.5$", is irrelevant to the mode of the laser beam L. Unlike the prior arts such as described in JP-A-2002-118312, it is not a requirement for cutting a thick plate that the energy density is low in the center portion of a laser beam.

As shown in FIG. 9A, the energy distribution of a laser beam L with $M^2=2.8$ in accordance with the present invention is similar to the energy distribution of a laser beam of a Gaussian mode (TEM00 mode) with $M^2=1.0$. Further, as shown in FIG. 9B, the energy distribution of a laser beam L with $M^2=4.1$ in accordance with the present invention is similar to the energy distribution of a laser beam of a ring mode (TEM01* mode) with $M^2=1.7$.

While the invention has been described with reference to specific preferred embodiments, it will be understood, by those skilled in the art, that various changes and modifications may be made thereto without departing from the spirit and scope of the following claims.

The invention claimed is:

1. A laser cutting apparatus comprising:
a gas laser oscillator; and
an optical system including a collective lens and transmitting and collecting a laser beam generated in said gas laser oscillator to irradiate a workpiece with the laser beam;
wherein a beam quality index $M^2$ of the laser beam emerging from said optical system, with which the workpiece is irradiated, is in a range of 2.8 to 4.5; while the index $M^2$ is defined by a formula:

$$M^2=\pi \times (dm)^2/(4 \times \lambda \times Zr)$$

in which λ is a wavelength of the laser beam; dm is a minimum beam diameter of the laser beam in a predetermined optical-path range including a focal point of said collective lens; and Zr is a distance between a first position on an optical axis, at which said minimum beam diameter dm is established, and a second position on said optical axis, at which a beam diameter "$2^{1/2} \times$ dm" is established, in the laser beam in said predetermined optical-path range,
wherein said optical system includes a beam-quality modifying optical element affecting a value of said index $M^2$.

2. A laser cutting apparatus as set forth in claim 1, wherein said minimum beam diameter dm and said distance Zr have a correlation of "dm/Zr>0.003".

3. A laser cutting apparatus as set forth in claim 1, wherein the laser beam generated in said gas laser oscillator represents said index $M^2$ less than 2.8, in a case where the laser beam does not pass through said beam-quality modifying optical element.

4. A laser cutting apparatus as set forth in claim 1, wherein said beam-quality modifying optical element is selected from a group including an aspheric lens, an aspheric mirror and a variable-shape type aspheric mirror.

5. A laser cutting apparatus as set forth in claim 1, wherein said beam-quality modifying optical element is provided to be capable of being inserted and extracted relative to an optical path of the laser beam.

* * * * *